United States Patent
Poloskey et al.

[11] Patent Number: 6,134,895
[45] Date of Patent: Oct. 24, 2000

[54] METHOD OF AIR CONDITIONING SYSTEM TEMPERATURE CONTROL

[75] Inventors: Kenneth R. Poloskey, Northville; Steven C. Huetteman, Canton, both of Mich.

[73] Assignee: Chrysler Corporation, Auburn Hills, Mich.

[21] Appl. No.: 08/955,044

[22] Filed: Oct. 21, 1997

[51] Int. Cl.[7] .............................. F25D 17/06; F25D 17/04
[52] U.S. Cl. .................................. 62/97; 62/186; 165/249
[58] Field of Search ................................... 62/97, 186, 89, 62/177; 165/249

[56] References Cited

U.S. PATENT DOCUMENTS

| | | |
|---|---|---|
| 3,037,363 | 6/1962 | Jacobs . |
| 4,164,172 | 8/1979 | Anderten et al. . |
| 4,320,628 | 3/1982 | Okajima ................................. 62/186 |
| 4,337,818 | 7/1982 | Franz . |
| 4,450,897 | 5/1984 | Iijima et al. . |
| 4,490,987 | 1/1985 | Peterson . |
| 4,546,617 | 10/1985 | Suzuki et al. . |
| 4,582,124 | 4/1986 | Yoshimi et al. . |
| 4,646,535 | 3/1987 | Matsuoka et al. . |
| 4,723,416 | 2/1988 | Suzuki . |
| 4,856,293 | 8/1989 | Takahashi et al. . |
| 4,860,549 | 8/1989 | Murayama . |
| 4,928,499 | 5/1990 | Kiminami et al. . |
| 4,974,776 | 12/1990 | Oshizawa . |
| 5,749,236 | 5/1998 | Tavian et al. .............................. 62/186 |

*Primary Examiner*—William Wayner
*Attorney, Agent, or Firm*—Roland A. Fuller, III

[57] ABSTRACT

A method of air conditioning system temperature control for a motor vehicle is disclosed. The method includes the steps of measuring an air conditioning compressor discharge pressure and determining if the discharge pressure is greater than a predetermined maximum pressure. The method also includes the step of beginning a forced recirculated air mode if the discharge pressure is greater than the predetermined maximum pressure. The method further includes the steps of determining if the air conditioning system is already in a forced recirculated air mode if the discharge pressure is less than the predetermined maximum pressure, and determining if the discharge pressure is less than a predetermined acceptable pressure if the air conditioning system is already in a forced recirculated air mode. The method still further includes the step of beginning an outside air mode if the discharge pressure is less than the predetermined acceptable pressure.

6 Claims, 3 Drawing Sheets

METHOD OF AIR CONDITIONING SYSTEM TEMPERATURE CONTROL

BACKGROUND OF THE INVENTION

1. Field of the Invention

The present invention relates generally to an air conditioning system in a vehicle and, more particularly, to a method of air conditioning system temperature control for a motor vehicle.

2. Description of the Related Art

An air conditioning system is one feature on a motor vehicle to maintain the temperature of the occupant compartment of the motor vehicle at a comfortable level. The air conditioning system provides cool, dehumidified air for circulation in the occupant compartment of the motor vehicle. The primary components of the air conditioning system include a compressor, a refrigerant, air, an evaporator, a condenser, and a ventilation system. It is well known in the art for the air conditioning system to draw air to be cooled from outside the motor vehicle, from inside the occupant compartment of the motor vehicle, or from a mixture of outside and inside air.

From a vehicle occupant perspective, it is desirable to maintain the occupant compartment temperature at a comfortable level. The ability of the air conditioning system to maintain a consistent temperature may be affected by several factors such as a cab forward vehicle design. In a cab forward vehicle design, the frontal area of the grill is less than a conventional vehicle design, effectively reducing the potential volume of air available to the condenser of the air conditioning system.

Another factor is weather and driving conditions. For example, if the outside air temperature is elevated and the motor vehicle is stopped, or in city traffic, and the air conditioning system is in an outside air mode, the air conditioning system must work harder to remove heat from the air. This can lead to a higher air conditioning compressor discharge pressure, and a higher pressure may lead to a higher air conditioning system outlet air temperature. Also, with an increased air conditioning compressor discharge pressure, there is a potential for the performance of the air conditioning compressor to be degraded. Furthermore, the durability of an individual air conditioning system component may be compromised by an increased air conditioning compressor discharge pressure. Thus, there is a need in the art for a method of controlling an air conditioning compressor discharge pressure for improving temperature control within the occupant compartment of the motor vehicle.

SUMMARY OF THE INVENTION

It is, therefore, one object of the present invention to provide a method of air conditioning system temperature control for a motor vehicle.

It is another object of the present invention to provide a method of air conditioning system temperature control for a motor vehicle that reduces air conditioning compressor discharge pressure.

It is another object of the present invention to provide a method of air conditioning system temperature control for a motor vehicle that reduces air conditioning compressor discharge pressure for improved air conditioning system outlet air temperature control.

To achieve the foregoing objects, the present invention is a method of air conditioning system temperature control for a motor vehicle. The method includes the steps of measuring an air conditioning compressor discharge pressure and determining if the discharge pressure is greater than a predetermined maximum pressure. The method also includes the step of beginning a forced recirculated air mode if the discharge pressure is greater than the predetermined maximum pressure. The method further includes the steps of determining if the air conditioning system is already in a forced recirculated air mode if the discharge pressure is less than the predetermined maximum pressure and determining if the discharge pressure is less than a predetermined acceptable pressure if the air conditioning system is already in a forced recirculated air mode. The method still further includes the step of beginning an outside air mode if the discharge pressure is less than the predetermined acceptable pressure.

One advantage of the present invention is that a new method of air conditioning system temperature control is provided for a motor vehicle. Another advantage of the present invention is that a method of air conditioning system temperature control is provided that monitors the air conditioning compressor discharge pressure and enters into a forced recirculated air mode of operation if the pressure is too high. A further advantage of the present invention is that a method of air conditioning system temperature control is provided that reduces air conditioning compressor discharge pressure by inputting recirculated air to the air conditioning system to reduce the load on the air conditioning compressor.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
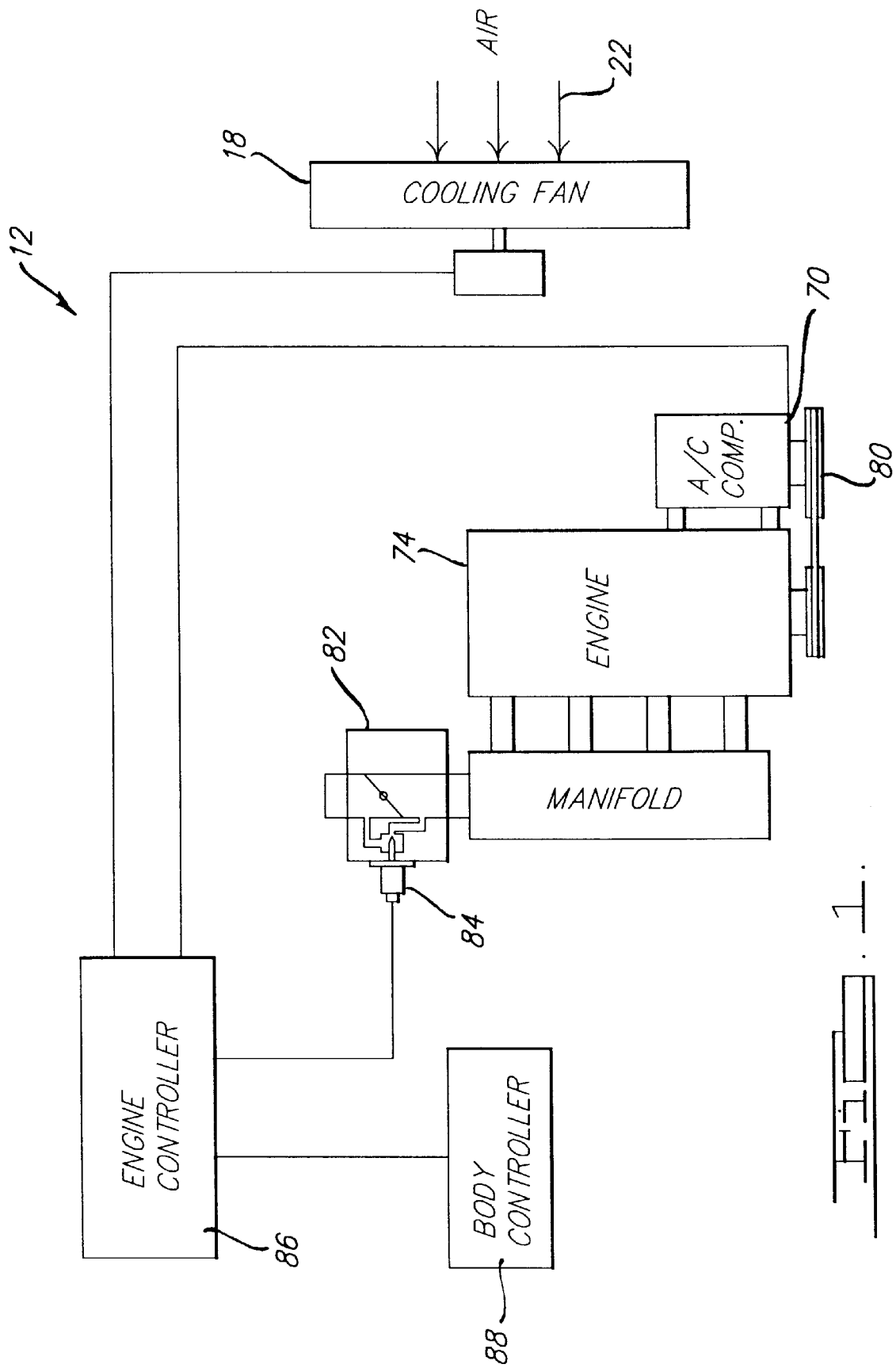
FIG. 1 is a block diagram of an air conditioning system for a motor vehicle.
Figure 2:
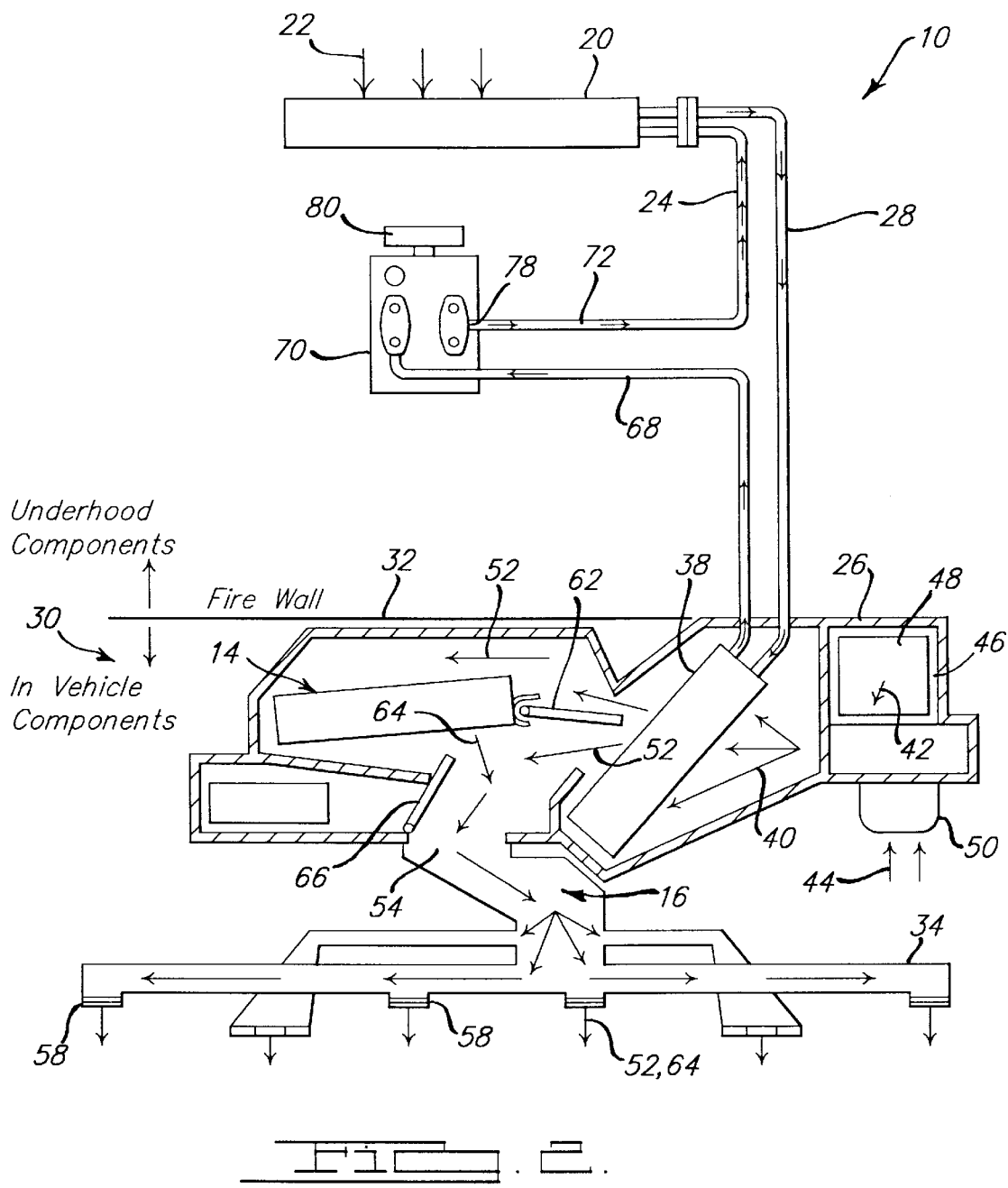
FIG. 2 is a block diagram of the air conditioning system for a motor vehicle of FIG. 1.

Referring to FIGS. 1 and 2, an air conditioning system 12 is illustrated schematically for a motor vehicle (not shown). It should be appreciated that the air conditioning system 12 is part of a climate control system 10 for a motor vehicle, as is well known in the art, that also includes a heating system 14 and a ventilation system 16. It should also be appreciated that, in this example, the air conditioning system 12 operates in a particular mode such as an outside air mode, a recirculated air mode, or a forced recirculated air mode, to be described.

Preferably, the air conditioning system 12 is typical of a vapor-compression refrigerator cycle for a closed loop system, as is well known in the art. The working fluid is a refrigerant (not shown), such as Freon. The air conditioning system 12 includes a cooling fan 18. The cooling fan 18 is positioned behind the front grill (not shown) of the motor vehicle. The cooling fan 18 draws air into the engine compartment portion of the vehicle. A condenser 20 is also positioned behind the front grill. One input into the condenser 20 is air 22, such as air drawn in through the grill by the cooling fan 18. A refrigerant 24 in a gaseous state, is another input into the condenser 20. Within the condenser 20, a thermodynamic reaction takes place causing the refrigerant 24 to change from a gas into a liquid through the transfer of heat from the refrigerant 24 to the air 22. The heated air 22 is subsequently vented from the condenser 20 to the outside air, preferably at a constant pressure.

The now liquid refrigerant 24 flows from the condenser 20 to a heating, ventilation and air conditioning unit (HVAC) 26 through a first passageway 28 operably connected between the condenser 20 and HVAC unit 26, as is well known in the art. In this example, the HVAC unit 26 is positioned on an occupant compartment 30 side of a dash panel 32, and below an instrument panel 34. The HVAC unit 26 contains the heating system 14, an evaporator 38 and the ventilation system 16.

The refrigerant enters the evaporator 38 of the HVAC unit 26. The evaporator 38 also receives a flow of air to conditioned 40. Depending on the air conditioning system 10 mode, the flow of air to be conditioned 40 is either fresh outside air 42, or recirculated air 44 from the occupant compartment 30. It should be appreciated that the flow of air to be conditioned 40 could also be a mixture of outside air 42 and recirculated air 44.

In the outside air mode, outside air 42 is drawn into the vehicle through a vent located near a windshield of the vehicle (not shown but well known in the art). From the vent, the outside air 42 is drawn into a chamber 46 through a recirculating air door 48 in an open position (not shown). Preferably, when the recirculating air door 48 is completely open, one hundred percent (100%) outside air 42 is drawn into the chamber 46 and an opening (not shown) for the ingress of recirculating air 44 into the chamber 46 is blocked. In the recirculated air mode, air from the occupant compartment, also referred to as recirculated air 44, is drawn into the chamber 46. Preferably, the recirculated air 44 is drawn by a blower 50 into the chamber 46 from the occupant compartment 30. The recirculating air door 48 is in a completely closed position, as shown in FIG. 2, to prevent outside air 42 from being drawn into the chamber 46.

In a mixed air mode, the recirculating air door 48 is in a partially open position, thereby allowing a mixture of outside air 42 and recirculated air 44 to be drawn into the chamber 46.

From the chamber 46, the air to be conditioned 40 flows to the evaporator 38. The evaporator 38 cools and dehumidifies the air to be conditioned 40 by the thermodynamic transfer of heat from the air to be conditioned 40 to the refrigerant 24. During this stage of the cycle, the state of the refrigerant 24 is changed from a liquid to a gas.

The now cooled air 52 is distributed by the ventilation system 16 to the occupant compartment 30. The ventilation system 16 includes a plurality of ducts 54, doors (to be described) and air outlets 58, as is well known in the art. In this example, an outlet 58 is positioned in the instrument panel 34. It should be appreciated that the cooled air 52 leaving the evaporator 38 may be directed to pass through the heating system 14 by the positioning of a blend air door 62 in the ventilation system 16. The passage of the cooled air 52 through the heating system 14 adjusts the temperature of the cooled air 52. The temperature adjusted air 64 leaving the heating system 14 may be directed to an outlet 58 near the windshield or an outlet 58 near the floor, through the positioning of a mix mode door 66 in the ventilation system 16.

The refrigerant 24 leaves the evaporator 38 as a gas and travels through a second passageway 68 to a compressor 70.

The compressor 70, as is well known in the art, compresses the refrigerant 24 to increase the pressure of the refrigerant 24. The refrigerant 24 is discharged from the compressor 70 and then flows to the condenser 20 via a third passageway 72. The pressure of the refrigerant 24 as it is discharged from the compressor 70 is also referred to as a head pressure.

A pressure sensing mechanism (not shown), such as a pressure sensor, is operably connected to the compressor 70 at an outlet 78 to measure the head pressure. The compressor 70 is driven by an engine 74 and compresses the gas a predetermined amount. However, if the evaporator 38 is removing more heat from the air to be conditioned 40 than the air conditioning system 12 can handle, then the pressure of the refrigerant 24 leaving the evaporator 38 increases. The refrigerant 24 entering the compressor 70 is at an elevated pressure, and is discharged from the compressor 70 at a still greater pressure. Since the air conditioning system 12 is a closed system, if the discharge pressure is elevated, the pressure of the refrigerant 24 throughout the air conditioning system 12 is elevated and the evaporator 38 is not as efficient in removing heat from the air to be conditioned 40. This can result in a higher temperature of the cooled air 52 than needed to control the occupant compartment 30 to a desired temperature level.

Under certain conditions, such as high ambient temperature and city driving, the outside air mode is providing air to be conditioned 40 to the evaporator 38 at a high temperature, resulting in more heat being added to the air conditioning system 12 than the air conditioning system 12 can take out. This can result in an elevated compressor 70 discharge pressure. The use of the recirculated air mode may be advantageous, because the air in the occupant compartment 30 has already been cooled and humidified. Therefore, the evaporator 38 does not have to remove as much heat from the air to be conditioned 40, resulting in a lower pressure of the refrigerant 24 entering the compressor 70 and a lower discharge pressure.

If the discharge pressure is elevated, the use of the mixed air mode is not advantageous because of a potential for outside air 42 leakage through the ventilation system 16 and into the occupant compartment 30. For example, if the air conditioning system 12 is in a mixed air mode, the recirculating air door 48 is in a partially open position, vehicle speed is high and a blower fan speed 50 is low to medium, the mixed air mode may cause the discharge pressure to increase. In this mode, the higher pressure of the outside air 42 forced into the vehicle at high speeds pushes the hot outside air 42 past the intermediately positioned recirculating door 48 and into the occupant compartment 30. At the same time, the lower blower 50 speed draws a smaller amount of recirculated air 44 to the evaporator 38 to be cooled. This can significantly decrease occupant comfort because the temperature and humidity level of the occupant compartment 30 may not be at a desired level. Also, the evaporator 38 may have to work harder to provide cooled, humidified air 52 to the occupant compartment 30, because of the increased load on the compressor 70.

The compressor 70 is operatively connected to a clutch 80. The clutch 80 turns the compressor 70 on and off, as is well known in the art. The compressor 70 is also operatively connected to the engine 74. It should be appreciated that the engine 74, in this example, is an internal combustion engine capable of operating on a mixture of fuel and air (not shown). The fuel/air mixture enters the engine 74 through a fuel actuating mechanism 82, such as a throttle body, which meters the amount of fuel/air entering the engine 74. An air bypass actuator 84 is operably connected to the fuel actuating mechanism 82. The air bypass actuator 84 directs a flow of auxiliary air into the fuel actuating mechanism 82, in response to a signal from a control mechanism, to be described.

The air conditioning system 10 also includes a control mechanism such as an engine controller 86, or a body controller 88. Preferably, the engine controller 86 controls engine-related functions and the body controller 88 controls vehicle body related functions. Preferably, the engine controller 86 and body controller 88 are also in communication with each other. For example, the engine controller 86 is in communication with the engine 74 and the air conditioning system 12, and the body controller 88 directs the opening and closing of the recirculating air door 48 previously described.

Preferably, the air conditioning system 12 also includes other hardware, such as valves (not shown) and switches (not shown), which are conventional and well known in the art to carry out the method to be described.

Figure 3:
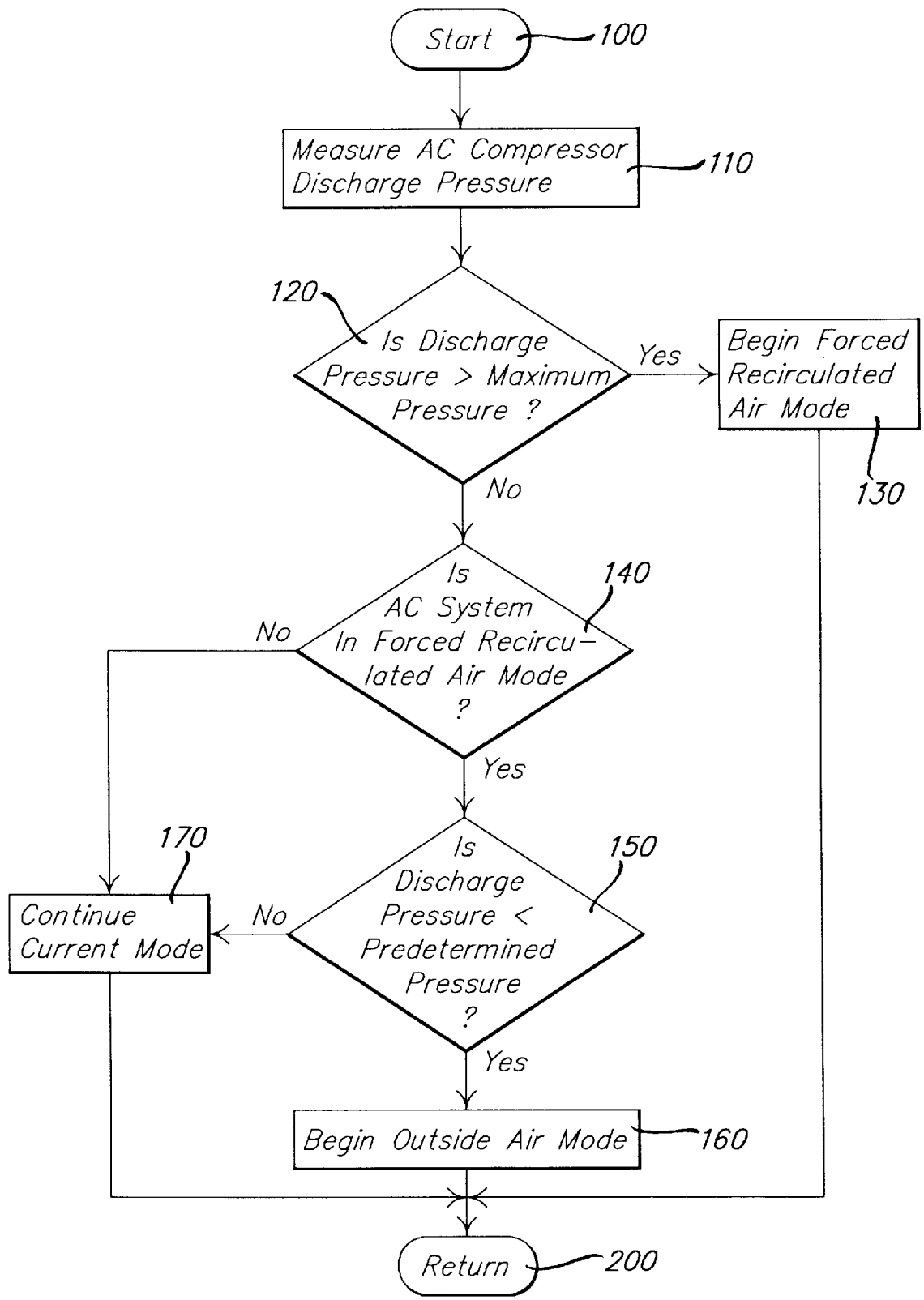
FIG. 3 is a flowchart of a method of air conditioning system temperature control, according to the present invention, for the air conditioning system of FIGS. 1 and 2.

Referring to FIG. 3, a method of air conditioning system temperature control, according to the present invention, is illustrated. The methodology begins in bubble 100, when it is called for from a control program stored in the engine controller 86, in this example. The methodology advances to block 110 and measures the air conditioning (AC) compressor 70 discharge pressure. The methodology advances to diamond 120.

In diamond 120, the methodology determines if the discharge pressure is greater than a predetermined maximum pressure. An example of a predetermined maximum pressure is 390–400 PSIG. If the methodology is greater than a predetermined maximum pressure, the methodology advances to block 130. In block 130, the methodology initiates a forced recirculated air mode. Preferably, the forced recirculated air mode positions the recirculating air door 48 so that one hundred percent (100%) recirculated air 44 and no outside air 42 is drawn into the evaporator 38, to achieve the full benefit of the recirculated air 44. It should be appreciated that in this example, the forced recirculated air mode takes precedence over an operator selected air conditioning mode. The methodology advances to block 200.

In block 200, the methodology returns.

Returning to block 120, if the discharge pressure is less than a predetermined maximum pressure, the methodology advances to diamond 140. In diamond 140, the methodology checks if the air conditioning system 12 is in a forced recirculated air mode. If the methodology is not in a forced recirculated air mode, then the discharge pressure is presumed to be at an acceptable level, and the methodology advances to block 170, to be described.

Returning to diamond 140, if the air conditioning system 12 is in a forced recirculated air mode, the methodology advances to diamond 150. In diamond 150, the methodology determines if the discharge pressure has decreased to an acceptable level, by determining if the discharge pressure is less than a predetermined acceptable pressure. An example of a predetermined acceptable pressure is between 320–350 PSIG. If the discharge pressure is less than a predetermined acceptable pressure, the methodology advances to block 160. In block 160, the methodology begins an outside air mode. The methodology advances to block 200.

Returning to block 150, if the discharge pressure is not less than a predetermined acceptable pressure, the methodology advances to block 170.

In block 170, the methodology continues the current air conditioning mode. The methodology advances to block 200, previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of air conditioning system temperature control for a motor vehicle comprising:

measuring an air conditioning compressor discharge pressure;

determining if the compressor discharge pressure is greater than a predetermined maximum pressure;

beginning a forced recirculated air mode if the discharge pressure is greater than the predetermined maximum pressure;

determining if the air conditioning system is already in a forced recirculated air mode if the discharge pressure is less than the predetermined maximum pressure; and determining if the discharge pressure is less than a predetermined acceptable pressure if the air conditioning system is already in the forced recirculated air mode and beginning an outside air mode if the discharge pressure is less than the predetermined acceptable pressure.

2. A method as set forth in claim 1 including the step of maintaining a current air conditioning mode if the air conditioning system is not in a forced recirculated air mode.

3. A method as set forth in claim 1 including the step of maintaining a current air conditioning mode if the discharge pressure is not less than the predetermined acceptable pressure.

4. A method of air conditioning system temperature control for a motor vehicle comprising:

measuring an air conditioning compressor discharge pressure;

determining if the compressor discharge pressure is greater than a predetermined maximum pressure;

beginning a forced recirculated air mode if the discharge pressure is greater than the predetermined maximum pressure and overriding an operator selected air conditioning mode;

determining if the air conditioning system is already in a forced recirculated air mode if the discharge pressure is less than the predetermined maximum pressure; and determining if the discharge pressure is less than a predetermined acceptable pressure if the air conditioning system is already in the forced recirculated air mode and beginning an outside air mode if the discharge pressure is less than the predetermined acceptable pressure.

5. A method as set forth in claim 4 wherein a recirculating air door is positioned so that one hundred percent (100%) recirculated air is drawn into the air conditioning system if the air conditioning system is in the forced recirculated air mode.

6. A method of air conditioning temperature control for a motor vehicle having an air conditioning system comprising:

measuring an air conditioning compressor discharge pressure;

determining if the discharge pressure is greater than a predetermined maximum pressure;

beginning a forced recirculated air mode if the discharge pressure is greater than the predetermined maximum pressure by positioning a recirculating air door so that one hundred percent (100%) recirculated air is drawn into the air conditioning system to be cooled if the air conditioning system is in the forced recirculated air mode and overriding an operator selected air conditioning operating mode;

determining if the air conditioning system is already in the forced recirculated air mode if the discharge pressure is less than the predetermined maximum pressure;

maintaining a current air conditioning mode if the air conditioning system is not in the forced recirculated air mode;

determining if the discharge pressure is less than a predetermined acceptable pressure if the air conditioning system is already in the forced recirculated air mode; and maintaining a current air conditioning mode if the discharge pressure is not less than the predetermined acceptable pressure and beginning an outside air mode if the discharge pressure is less than the predetermined acceptable pressure.

* * * * *